Jan. 5, 1954 A. M. BEST 2,665,015
LIVESTOCK FEEDER
Filed Oct. 30, 1952 2 Sheets-Sheet 1

INVENTOR.
Albert M. Best
BY Richard E. Babcock Jr.
Attorney

Jan. 5, 1954     A. M. BEST     2,665,015
LIVESTOCK FEEDER
Filed Oct. 30, 1952     2 Sheets-Sheet 2
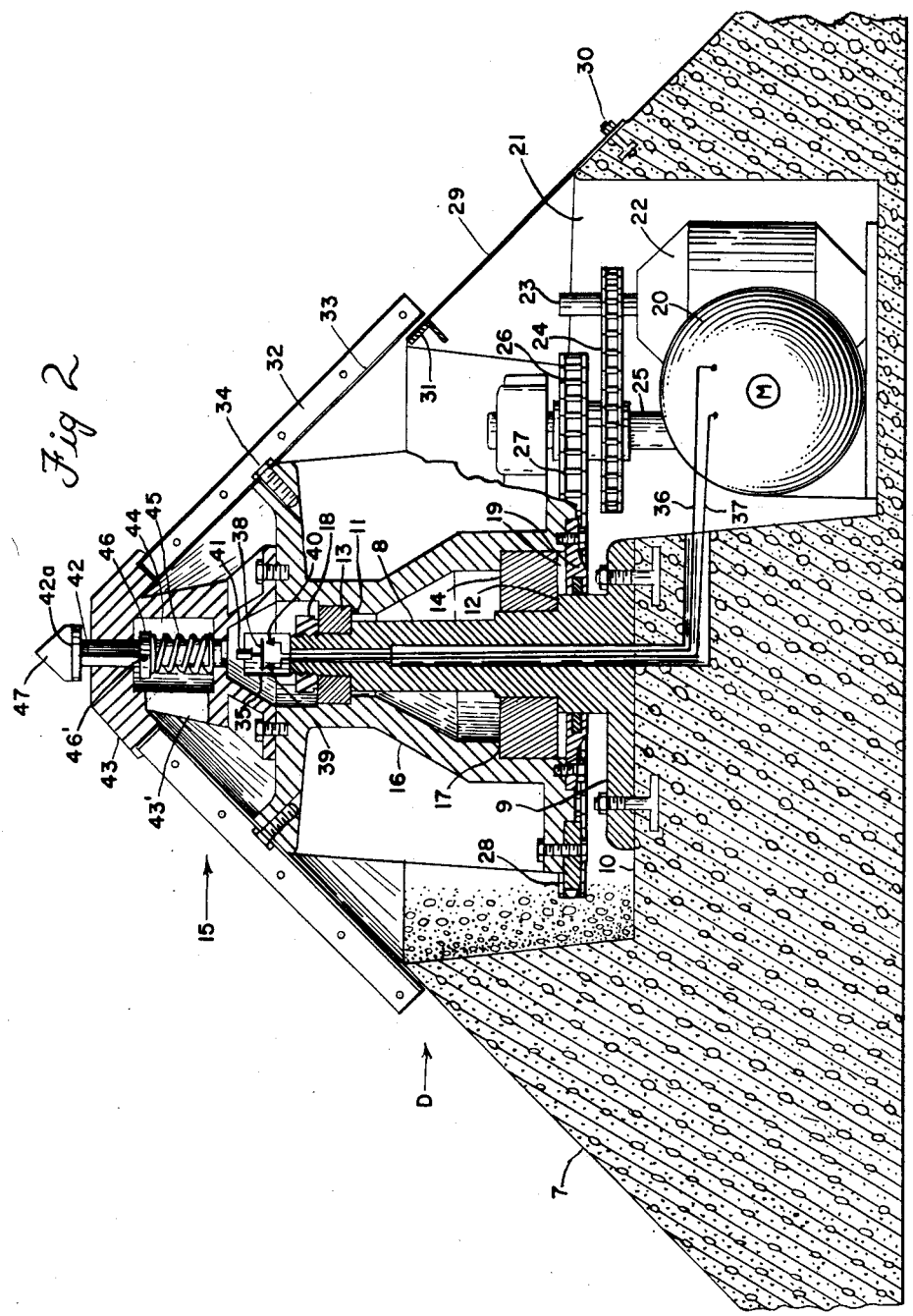
INVENTOR.
Albert M. Best
BY Richard E. Babcock Jr.
Attorney Patented Jan. 5, 1954

2,665,015

UNITED STATES PATENT OFFICE 2,665,015

LIVESTOCK FEEDER

Albert M. Best, New Holland, Pa., assignor to Sperry Corporation, New Holland, Pa., a corporation of Delaware Application October 30, 1952, Serial No. 317,776

16 Claims. (Cl. 214—17)

This invention relates to automatic mechanism for causing downward feeding of the contents of a silo or other receptacle, the contents of which are delivered downwardly by force of gravity for removal through openings in the lower end of the silo or receptacle.

It has previously been attempted to arrange silos in a manner such that livestock may have access to the lower portion of the silo contents through access openings in the side of the silo. It has further been known to arrange each such silo with a central conical distributor in its bottom to partially support the weight of the silo contents and to cause a lateral spreading of the descending ensilage from the center of the column of ensilage toward the silo sides for ready accessibility by the livestock.

Such arrangement has been found not fully satisfactory for the reason that after the livestock have eaten away the lower end of the ensilage column as far towards its center as possible, the apex of the conical distributor, by engagement with the central portion of the ensilage column will often prevent the column from descending as desired. Even though the column of ensilage may be of considerable weight, such engagement between the apex of the conical distributor and the lower end of the ensilage column when added to the frictional engagement of the column with the silo sides, will in many cases be sufficient to maintain the ensilage column in fixed position.

It is the primary object of the instant invention to overcome this difficulty by the provision in such a silo of an automatically controlled scraper element, the power drive means for which is actuated in response to the pressure exerted by the column of ensilage on a pressure responsive control element. The pressure responsive element is so arranged and disposed that when the outer marginal portions of the ensilage column have been eaten away or removed to concentrate the downward pressure of the ensilage column at a location adjacent its axial center, such pressure responsive element functions to cause actuation of the centrally disposed scraper element to remove the supporting central portion of the ensilage column and allow it to descend under the influence of gravity.

Moreover in accordance with the invention the same pressure responsive control element is adapted to discontinue actuation of the scraper element once the downward feeding of the ensilage column has been substantially slowed up or discontinued due to engagement between marginal portions of the column and a stationary supporting surface.

It is a further object of the invention to mount the pressure responsive control element for rotation with the scraper, the control element being provided with scraping or cutting means arranged to cut or remove material at a rate of speed no greater and preferably less than the scraper. With this arrangement the control element, after once being actuated to initiate operation of the scraper, will be retained in operative condition by the pressure of the ensilage until downward movement of the ensilage column has been substantially slowed down or interrupted by engagement of the ensilage column with a stationary support. At such time as the rate of cutting of the pressure responsive element exceeds the rate of descent of the ensilage column (the rate of descent of the ensilage column will equal the rate of scraping action of the scraper) the ensuing reduction of pressure on the pressure responsive control element will cause it to discontinue operation of the scraper.

The foregoing objects and advantages are all attained by the preferred embodiment of the invention illustrated in the accompanying drawings in which:

Figure 2 is an enlarged fragmentary sectional view taken substantially along the conical axis of the conical scraper and its associated structure.

Figure 1:
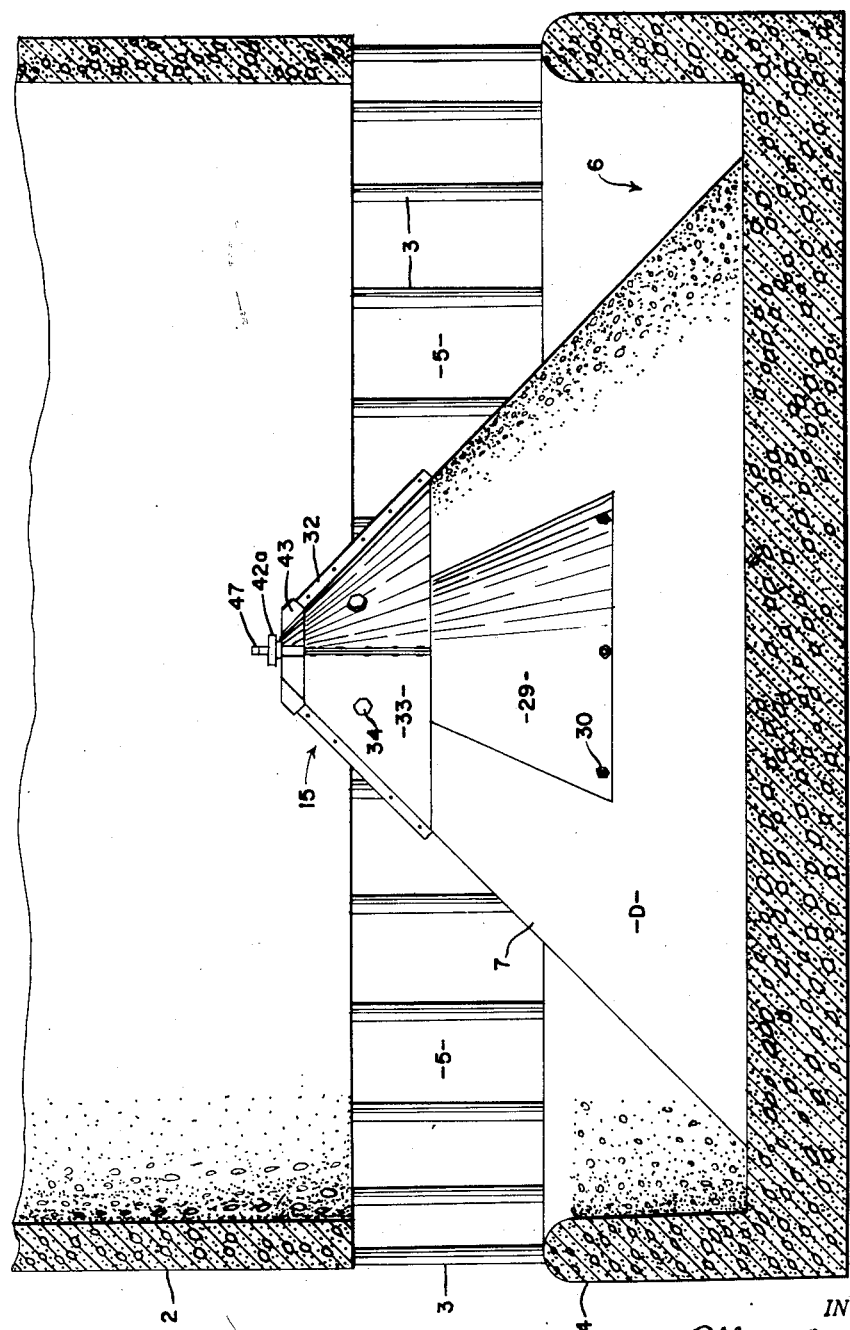
Figure 1 represents a sectional view through the lower end of a silo having the preferred embodiment of the invention installed therein.

Referring now in detail to the accompanying drawings, the invention is embodied in a silo, the upper or main portion 2 of which is supported by bars 3 in spaced relation above its lower end portion or section 4, to thus define between said bars and silo sections a circumferentially arranged series of access openings 5 through which livestock may gain access to the lower end of the column of silage within the silo.

In order to support the column of ensilage above the silo floor in a position of ready accessibility for the livestock, and to spread and distribute the descending ensilage laterally toward the side walls of the silo, there is provided a supporting and distributing structure, designated D in its entirety. The supporting and distributing structure D is preferably of a conical shape and coaxially located within the substantially cylindrical silo. Preferably this distributor structure D is spaced somewhat inwardly from the marginal wall of the silo to therewith define an annular bin 6 for receiving and maintaining loose silage in a position of ready accessibility to the openings 5.

The supporting and distributing structure D comprises a fixed hollow frustroconical base 7 of concrete or other suitable rigid material. Mounted interiorly and centrally of the base 7 is a vertical hollow spindle 8 having its supporting pedestal 9 open or otherwise fixedly secured on a supporting shelf or ledge 10 within the interior of the base 7.

Rotatably journalled on the spindle 8 and supported against downward displacement by annular shoulders 11 and 12 respectively thereon are annular upper and lower bearings 13 and 14.

The spindle and bearings above described exemplify one means of rotatably supporting a rotary scraper or agitator element, generally designated 15, the hub 16 of which is rotatably supported on the bearings 13 and 14. It will be noted that the hub 16 is journalled on both bearings 13 and 14 and has a downwardly directed shoulder 17 in abutment with the lower bearing 14 to position the hub for rotation at a fixed level on the spindle 8. A nut 18 threaded on the upper end of the spindle rotatably abuts against bearing 13 to prevent upward displacement of the hub 16.

Entry of dirt into the lower end of the hub 16 is prevented by a usual seal 19 bolted or otherwise connected over the lower end of the hub.

Electrically actuated drive means for rotating the scraper 15 may comprise a conventional electric motor 20 fixed within a recess 21 in the base 7 and transmitting power through a reduction gearbox 22, the output shaft 23 of which is connected by a chain drive 24 to a counter-shaft 25 to cause rotation thereof. Counter-shaft 25 in turn has a sprocket 26 keyed thereon which is connected by a chain 27 in driving relation to a ring sprocket 28 bolted or otherwise fixed on the lower axial end of the scraper hub 16.

In order to permit access to the motor and drive transmitting means for servicing, the recess 21 opens upwardly through the conical surface of base 7 at a location to one side of the scraper 15, and is covered by removable metal cover plate 29 which normally prevents entry of ensilage into the recess 21. Cover plate 29 may be removably bolted in place as at 30 and as shown in Figure 2, and its upper edge or end portion may be supported by rigid angle iron 31 embedded in the concrete base 7 and extending across the upper end of said opening.

The scraper 15 preferably has a conical exterior surface adapted when stationary to engage the lower end of and partially support the column of ensilage within the silo. Scraper blades 32 projecting upwardly from the conical surface of the scraper are adapted during rotation of the scraper to scrape away material from the lower end of the ensilage column and thus permit gradual descent of the ensilage column within the silo until such descent is appreciably slowed or terminated due to engagement of a sufficient area of the ensilage column with a stationary supporting surface which, in the preferred embodiment, is provided by the base 7.

In the illustrated exemplification the conical surface of the scraper 15 is formed by plurality of sector shaped metal plates 33 bolted on the hub as at 34. The upwardly turned radial marginal edges of these plates 33 are riveted or otherwise connected in abutting relation as shown to provide the respective scraper blades or elements 32.

The electrically actuated drive means is controlled through an actuating element in the form of a normally open control switch 35 mounted on the upper end of spindle 8 and connected in circuit with the motor 20 through a pair of conductors 36 and 37 extending axially through the hollow spindle 8 and the base 7 as shown.

The switch 35, diagrammatically illustrated in Figure 2, is of the conventional push button or doorbell type in which the movable contact 38 is resiliently urged away from the two fixed contacts 39 and 40 connected with the conductors 37 and 36 respectively to normally maintain the motor 20 de-energized. However, pressure on the button 41 will move the contact 38 connected thereto to close the switch and energize the motor 20. Electrical current may obviously be supplied to this circuit from any suitable source.

The switch is controlled by pressure responsive means on the scraper 15 to automatically energize the motor 20 and initiate operation of the scraper when the downward pressure of the ensilage within a localized area on the scraper, preferably at substantially the apex of the conical scraper, exceeds a predetermined amount.

In the preferred embodiment of the invention such pressure responsive means comprises a spring projected plunger 42 of square or other non-circular cross-section supported for axial movement through a conformingly shaped axial bore in a housing 43 bolted onto the upper end of the hub 16. The upper end or head 42a of the plunger thus occupies a position substantially at the apex of the conical scraper 15, and the plunger is in alignment with the switch button 41 so that its lower end may depress such button and close the switch 35 when the plunger 42 has been depressed to a sufficient extent by the weight of material on its enlarged head 42a.

It will be seen that the bore through which the plunger 42 moves communicates with a medially located chamber or enlargement 44. A spring 45 disposed about the plunger 42 in this chamber under compression between a collar 46 on the plunger and the lower end of the chamber 44, normally resiliently projects the plunger 42 upwardly to an extent which is determined by engagement between the collar 46 and the upper end of chamber 44. The collar 46 is fixed in the desired position of adjustment along the plunger 42 by means of a conventional set screw 46'.

In order to permit assembly of the spring 45 and collar 46 within the chamber 44, the housing is provided with an opening 43' communicating with the chamber 44 through one side of said housing. Thus in assembling these elements, the spring and collar 45 and 46 respectively may be inserted through the opening 43' and operatively positioned within the chamber 44 prior to insertion of the plunger 42 downwardly through the top of the housing 43. Thereafter the set screw 46' may be tightened by a tool inserted through the opening 43' to secure the collar 46 in the desired position of adjustment.

Plunger 42 has one or more scraper vanes or elements 47 disposed thereon, the arrangement being such that engagement between the square cross-section plunger 42 and its housing 43 will cause the plunger to rotate with the scraper 15, whereby the scraper element 47 on the plunger will be caused to operate contemperaneously with the scraper 15.

However, the scraper element 47 of the plunger is arranged and disposed in any suitable manner to scrape away material at the same or preferably a somewhat slower rate than the scraper 15, in order that the plunger 42 may remain depressed to maintain the scraper 15 in operation until the column of ensilage has been scraped away and fed downwardly to the desired extent.

The operation of the invention, which is believed to be obvious from the foregoing description, is as follows:

When the silo is first filled with ensilage, same will completely cover the floor of the silo including the distributing and supporting means generally designated D, and will extend in the form of a column to the top of the silo. At this time the weight of the column of ensilage will be substantially equally distributed over the silo floor and the entire area of the distributing and supporting element D.

However livestock feeding on the silo contents through the access openings 5 will normally remove or eat away the contents of the lower portion of the silo until the lower end of the ensilage column contacts only the plunger head 42a and a portion of the surface of the scraper 15. As the area of contact between the ensilage column and the scraper 15 diminishes it will be seen that the ensilage column exerts an increasing pressure on the plunger head 42a until finally the plunger is depressed sufficiently against the pressure of spring 45 to engage the switch button 41 and thus close the switch. This will institute operation of the motor 20 from which rotational movement will be transmitted to the scraper 15 through the reduction gear box 22 and the chain drives 24 and 27.

Rotation of the scraper 15 and the plunger 42 carried thereby will scrape away portions of the ensilage column directly above the scraper, permitting the column of ensilage thus to feed downwardly by gravity until its radially outer or marginal portions abut against the stationary support or base 7 to a sufficient extent to appreciably slow up or stop such descent.

Until thus slowed up or stopped, the rate of descent of the ensilage column will closely approximate the scraping speed of the scraper blades 32. Since the scraping element 47 on the plunger head 42a is arranged to cut away or scrape away material from the ensilage column at a slower rate of speed than the blades 32, it will be seen that the plunger 42 will remain depressed to keep the motor 20 in operation until such time as the slowing up or stopping of the descent of the ensilage column by its engagement with the base 7 permits the scraping element 47 to cut upwardly at a rate which will permit upward movement of the plunger 42 and opening of the switch 35. Such opening of the switch 35 will obviously shut off the motor 20 and discontinue the operation of the scraper 15 until such time as the removal of further material by the livestock in the manner aforementioned again depresses the plunger 42, causing a repeated actuation of the invention in the manner above described.

In this application I show and describe only the preferred embodiment of the invention simply to illustrate the best mode contemplated by me of carrying out the invention. However, I recognize that the invention is capable of embodiment in other forms than that illustrated, and that its several details may be modified in various ways, all without departing from the invention. Accordingly the drawings and description herein are to be construed as merely illustrative in nature and not as exclusive.

Having thus described my invention, I claim:

1. In a cylindrical silo having a vertical axis, a frustro-conical hollow base coaxially mounted in the lower end of said silo, a vertical spindle supported in said base coaxially therewith, a conical agitator rotatable on said spindle whereby the material in said silo will partially rest on said scraper, in combination with electrically actuated drive means for rotating said scraper, a normally open control switch on the upper end of said spindle in circuit with said electrically actuated drive means, and a plunger resiliently upwardly projected through said scraper in axial alignment with said control switch, whereby pressure of silage on said plunger may actuate same to close said switch and institute rotation of the scraper.

2. In a silo a frustro-conical hollow base disposed in the lower end of said silo, a vertical spindle supported in said base, a substantially conical scraper rotatable on said spindle and partially supporting the contents of said silo, electrically actuated drive means for rotating said agitator, a normally open control switch for said drive means having an actuating element disposed coaxially within said scraper, and a pressure responsive element mounted coaxially on said scraper and operatively associated with said actuating element to energize said drive means when the pressure of material on said pressure responsive element exceeds a predetermined amount.

3. In a silo, a base disposed in the lower end of said silo, a vertical spindle supported by said base, a conical scraper rotatable on said spindle above said base and partially supporting the contents of said silo above the base, electrically actuated drive means for rotating said scraper, a normally open control switch for said drive means having an actuating element disposed coaxially with said scraper, a normally open control switch for said drive means having an actuating element disposed coaxially with said scraper, and a pressure responsive element mounted coaxially on said scraper and operatively associated with said actuating element to energize said drive means when the pressure of material on said pressure responsive element exceeds a predetermined amount.

4. In a silo, a conical scraper and means supporting same at the lower end of said silo for rotation about its conical axis, whereby said scraper may partially support the silo contents, electrically actuated drive means for rotating said scraper, a control switch for said drive means having an actuating element fixedly disposed beneath the apex of said scraper, a pressure responsive element defining the apex of said conical scraper and operatively associated with said actuating element to energize said drive means when the pressure of the silo contents on said pressure responsive element exceeds a predetermined amount.

5. In a silo, a conical scraper and means supporting same at the lower end of said silo for rotation about its conical axis, whereby said scraper may partially support the silo contents, electrically actuated drive means for rotating said scraper a control switch for said drive means having an actuating element fixedly disposed beneath the apex of said scraper, a plunger guided for axial movement through the said scraper above said actuating element, means normally resiliently projecting said plunger upwardly through said scraper and out of operative engagement with said actuating element, whereby downward pressure of the silo contents on said plunger in excess of a predetermined amount will press said plunger down into operative engagement with said actuating element to energize said drive means.

6. The combination of claim 5, in which the said plunger is mounted for rotation with the scraper, a scraping element being mounted on said plunger to remove the silo contents from immediately there above and relieve the pressure thereon when downward movement of the silo contents ceases.

7. The combination of claim 4 in which the said pressure responsive element is rotatable with the scraper, an upwardly directed scraper element being carried by said pressure responsive element to relieve the pressure of the silo contents thereon when the downward movement of said contents ceases.

8. Automatic down feed means for an upright storage receptacle, comprising an interiorly disposed base at the lower end of said receptacle, said receptacle being provided with access openings permitting the removal of the receptacle contents from just above said base, a conical scraper supported above said base for rotation about its conical axis, whereby said scraper may partially support the receptacle contents, electrically actuated drive means for rotating said scraper, a control switch for said drive means having an actuating element fixedly disposed beneath the apex of said scraper, a pressure responsive element defining the apex of said conical scraper and operatively associated with said actuating element to energize said drive means when the pressure of the silo contents on said pressure responsive element exceeds a predetermined amount.

9. Automatic down feed means for an upright storage receptacle, comprising an interiorly disposed base at the lower end of said receptacle, said receptacle being provided with access openings permitting the removal of the receptacle contents from a location just above said base, a conical scraper supported above said base for rotation about its conical axis, whereby said scraper may partially support the receptacle contents, drive means for rotating said scraper, a control means for said drive means having an actuating element fixedly disposed beneath the apex of said scraper, a pressure responsive element mounted substantially at the apex of said scraper and operatively associated with said actuating element to initiate the operation of said drive means when the pressure of the receptacle contents thereon exceeds a predetermined amount.

10. In a silo, a base at the bottom of said silo adapted to support at least a portion of the weight of the material in said silo, a scraper and means supporting same for rotation at a fixed level above said base, said scraper normally being stationary and sharing with the base the burden of partially supporting the silo contents, electrically actuated drive means for rotating said scraper, a control switch for said drive means, and pressure responsive means on said scraper operatively associated with said control switch to energize said drive means when the pressure on the pressure responsive means exceeds a predetermined amount, whereby said scraper may remove a portion of the silo contents immediately there above and permit downward movement of said contents into supporting engagement with said base.

11. In a silo, a conical base at the bottom of said silo, a conical scraper mounted coaxially on said base for rotation there above, said base projecting marginally from beneath said scraper, said scraper normally being stationary and normally sharing with the base in partially supporting the weight of the silo contents, electrically actuated drive means for rotating said scraper, a control switch for said drive means, and pressure responsive means on said scraper operatively associated with said control means to energize said drive means when removal of the silo contents immediately above said base causes the pressure of the remaining contents on the scraper to exceed a predetermined amount, whereby said scraper may displace a portion of the silo contents immediately there above and permit the contents to descend into supporting engagement with the base, said pressure responsive means being rotatable with the scraper and having a scraper element thereon to penetrate upwardly into the silo contents as the latter descends.

12. The mechanism defined in claim 11 in which the said scraper element is arranged and adapted to scrape away the silo contents there above at a slower rate than the said scraper, whereby descent of the silo contents at a rate of speed similar to that of the cutting action of the scraper will maintain the actuating pressure on said pressure responsive element until the descent of the silo contents is decreased by engagement with the said base to a rate of speed less than that of the upward cutting action of the scraper element, whereby said scraper element may then relieve the pressure on said pressure responsive element and de-energize said drive means.

13. In a silo, a base at the bottom of said silo, a scraper mounted coaxially on said base for rotation there above, said base projecting marginally from beneath said scraper, said scraper being normally stationary and normally sharing with the base in partially supporting the weight of the silo contents, drive means for rotating said scraper, a control means for said drive means, and pressure responsive means on said scraper operatively associated with said control means to energize said drive means when removal of that portion of the silo contents immediately above the base causes the pressure on the said pressure responsive means to exceed a predetermined amount, whereby said scraper may displace a portion of the silo contents immediately there above and permit the said contents to descend into engagement with the base, said pressure responsive means rotatable with the scraper and having scraper means thereon to permit its penetration of the silo contents.

14. In a silo, a base at the bottom of said silo, a scraper mounted for rotation above said base, said base projecting marginally from beneath said scraper, said scraper being normally stationary and normally sharing with the base in partially supporting the weight of the silo contents, drive means for rotating said scraper, a control means for said drive means, pressure responsive means carried by said scraper and operatively associated with said control means to energize said drive means when pressure on said pressure responsive means exceeds a predetermined amount.

15. The combination defined in claim 13 wherein the scraper means on said pressure responsive means is arranged and adapted to penetrate the silo contents at a slower rate of speed than the scraper, whereby actuating pressure will be maintained on the said pressure responsive means by the silo contents until the downward movement of said contents is slowed by engagement with said base to a speed less than the penetrating speed of said scraper means.

16. The combination of claim 14 in which said pressure responsive means is rotatable with the scraper, a scraper element being carried by said pressure responsive means, said scraper element being arranged and adapted to penetrate the silo contents at a rate of speed no greater than that of the scraper.

ALBERT M. BEST.

No references cited.